US008857726B2

(12) United States Patent
Choi

(10) Patent No.: US 8,857,726 B2
(45) Date of Patent: Oct. 14, 2014

(54) APPARATUS AND METHOD FOR GENERATING AND RECOGNIZING BARCODE IN PORTABLE TERMINAL

(75) Inventor: Sung-Woo Choi, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 108 days.

(21) Appl. No.: 13/492,121

(22) Filed: Jun. 8, 2012

(65) Prior Publication Data

US 2012/0312878 A1    Dec. 13, 2012

(30) Foreign Application Priority Data

Jun. 10, 2011    (KR) ........................ 10-2011-0056270

(51) Int. Cl.
*G06K 19/06*    (2006.01)
*G06K 7/10*    (2006.01)

(52) U.S. Cl.
CPC ........ *G06K 19/0637* (2013.01); *G06K 7/10722* (2013.01)
USPC ..................................... 235/494; 235/462.07

(58) Field of Classification Search
CPC ... G06K 7/10; G06K 9/18; G06K 189/06037; G06K 7/1417
USPC ........................ 235/462.09–11, 462.25, 494
See application file for complete search history.

(56) References Cited

U.S. PATENT DOCUMENTS

| 7,337,970 B2* | 3/2008 | Joseph et al. ............... 235/462.1 |
| 7,726,572 B2* | 6/2010 | He et al. ...................... 235/462.1 |
| 8,096,480 B2* | 1/2012 | Yi et al. .......................... 235/494 |
| 8,152,070 B2* | 4/2012 | Al-Hussein et al. ..... 235/462.11 |

FOREIGN PATENT DOCUMENTS

KR    1020060061642    6/2006

* cited by examiner

*Primary Examiner* — Daniel St Cyr
(74) *Attorney, Agent, or Firm* — The Farrell Law Firm, P.C.

(57) ABSTRACT

An apparatus and a method for generating and recognizing a barcode in a portable terminal are provided. The apparatus for generating and recognizing a barcode in a portable terminal includes a barcode generator for dividing a barcode into a symbol region, in which data is stored, and a pattern region, in which information on a position of the barcode and the data stored in the symbol region is stored, and positioning a plurality of groups of error correction blocks while interconnecting a plurality of error correction blocks belonging to a same group in the symbol region; and a barcode recognizer for extracting information on the position of the barcode and the data stored in the symbol region through the pattern region of the barcode and searching for a symbol in the symbol region to extract data from the searched symbol.

18 Claims, 6 Drawing Sheets

APPARATUS AND METHOD FOR GENERATING AND RECOGNIZING BARCODE IN PORTABLE TERMINAL

PRIORITY

This application claims priority under 35 U.S.C. §119(a) to a Korean Patent Application filed in the Korean Intellectual Property Office on Jun. 10, 2011 and assigned Serial No. 10-2011-0056270, the entire disclosure of which is incorporated herein by reference.

BACKGROUND OF THE INVENTION

1. Field of the Invention

The present invention relates generally to an apparatus and a method for generating and recognizing a barcode in a portable terminal and, more particularly, to an apparatus and a method for generating and recognizing a barcode in a portable terminal, which can generate a barcode in which high capacity data can be stored, and, which can recognize the high capacity data stored in the barcode.

2. Description of the Related Art

A conventional two-dimensional barcode, such as a Quick Response (QR) Code (as in Japan) or a Matrix Code (as in the United States), is implemented by an algorithm in which low capacity data is stored and restored in a low density Dots Per Inch (DPI) environment, and a barcode having a size of 2 centimeters (cm)×2 cm can store and restore (e.g., decompressing and restoring the original data) data having a size of about 1000 bytes.

A Reed-Solomon algorithm and a redundancy block construction appropriate for storing and restoring a low density symbol (a minimum unit of information such as a bit) and an interleaving algorithm and a compression method optimized for the low-density DPI are relatively fast in comparison with a DPI with a high decoding rate. However, as modern optical technology is developed and performance of embedded processors are improved, the time difference between processing of low-density DPI and processing of high-density DPI is not very large, such that the necessity for the implementation of a barcode algorithm in the high density DPI is greater.

Since the conventional two-dimensional barcode stores low-capacity data, an Error Correcting Code (ECC) block (i.e., data for correcting an error) is limited, so that the barcode is sensitive to some minor noise. The ECC block may be able to guard against a random error but cannot always adequately guard against a burst error, and inevitably has a low error recovery rate of the barcode. Further, a method of encoding data necessary for an error correction statically determines an error correction level in each of preset levels in general, so that it is not efficient.

A currently used one-dimensional or two dimensional barcode has a small storage capacity, so that it is only able to store simple text data or numbers. Further, an existing barcode is of a form in which a size of the barcode is increased based on storage capacity, and in order to store large data, a size of the barcode must also be increased. Thus, such a large barcode would be mostly beyond a range recognizable by certain devices such as an embedded small camera. Furthermore, a capacity necessary for storing a simple Musical Instrument Digital Interface (MIDI) file or ordinary single music (a quartet) based on a Note Worthy Composer (NWC) format is approximately 4000 bytes, and existing barcodes cannot store such high capacity data. Finally, the one-dimensional or two dimensional barcode cannot support a capacity required for encoding a digital document, such as a Microsoft® Word file, to be used in a computer.

SUMMARY OF THE INVENTION

Accordingly, the present invention has been made to solve the above-stated problems occurring in the prior art, and an aspect of the present invention provides an apparatus and a method for generating and recognizing a barcode in a portable terminal, which can generate a barcode in which high-capacity data can be stored, and which can recognize and store the high-capacity data stored in the barcode.

In accordance with an aspect of the present invention an apparatus for generating and recognizing a barcode in a portable terminal is provided. The apparatus includes a barcode generator for dividing a barcode into a symbol region, in which data is stored, and a pattern region, in which information on a position of the barcode and the data stored in the symbol region is stored, and positioning a plurality of groups of error correction blocks while interconnecting a plurality of error correction blocks belonging to a same group in the symbol region; and a barcode recognizer for extracting information on the position of the barcode and the data stored in the symbol region through the pattern region of the barcode and searching for a symbol in the symbol region to extract data from the searched symbol.

In accordance with another aspect of the present invention, a method of generating and recognizing a barcode in a portable terminal is provided. The method includes generating a barcode by configuring the barcode to include a symbol region, in which data is stored, and a pattern region, in which information on a position of the barcode and the data stored in the symbol region is stored, and positioning a plurality of groups of error correction blocks while interconnecting a plurality of error correction blocks belonging to a same group in the symbol region; and recognizing the barcode by extracting information on the position of the barcode and the data stored in the symbol region through the pattern region of the barcode, and searching for a symbol in the symbol region to extract data from the searched symbol

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
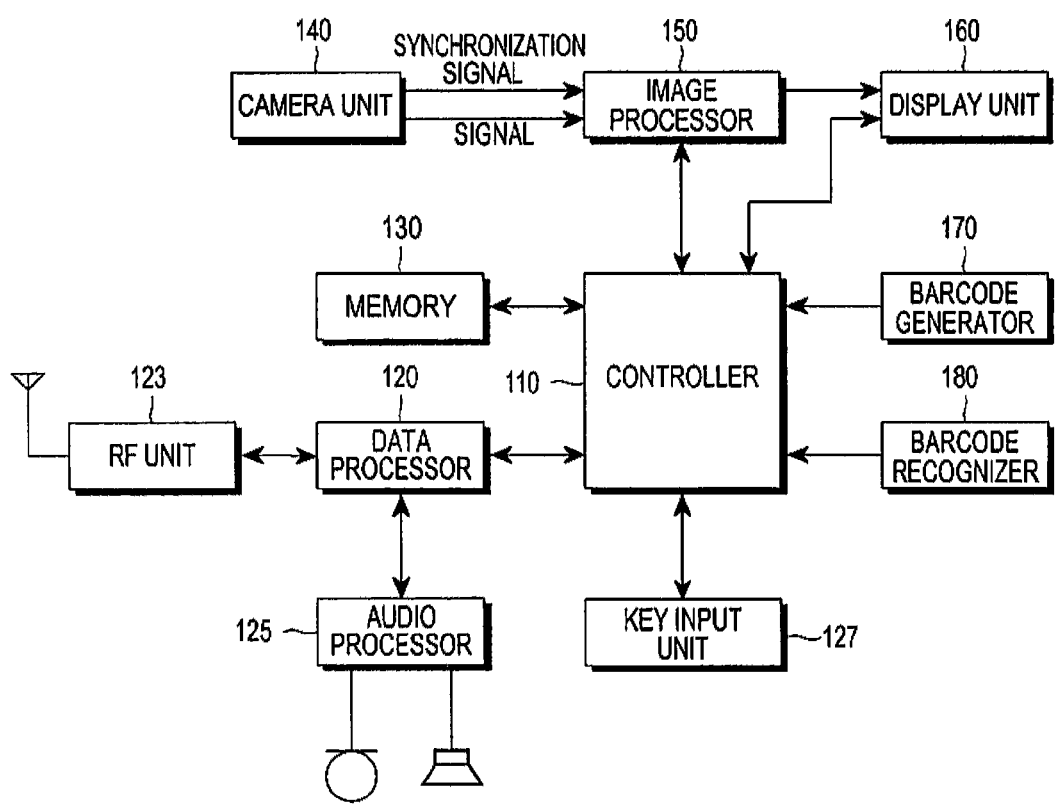
FIG. 1 is a block diagram illustrating a portable terminal according to an embodiment of the present invention.

Hereinafter, embodiments of the present invention will be described with reference to the accompanying drawings. Throughout the drawings, the same elements will be designated by the same reference numerals.

FIG. 1 is a block diagram illustrating a portable terminal according to an embodiment of the present invention.

Referring to FIG. 1, a Radio Frequency (RF) unit 123 performs a wireless communication function of a portable terminal. The RF unit 123 includes an RF transmitter for up-converting and amplifying a frequency of a transmitted signal and an RF receiver for low-noise amplifying a received signal and down-converting a frequency. A data processor 120 includes a transmitter for encoding and modulating the transmitted signal and a receiver for demodulating and decoding the received signal. That is, the data processor 120 includes a Modulator/Demodulator (modem) and a Coder/Decoder (codec). The codec includes a data codec for processing packet data, and an audio codec for processing an audio signal, such as voice. An audio processor 125 reproduces a received audio signal output from the audio codec of the data processor 120 or transmitting a received audio signal generated from a microphone to the audio codec of the data processor 120.

A key input unit 127 includes keys for inputting number and character information and function keys for setting various functions.

A memory 130 may include a program memory and a data memory. The program memory may store programs for controlling the general operation of the portable terminal, a program for generating a barcode in which high capacity data can be stored, and a program for recognizing the barcode.

Further, the program memory of the memory 130 stores data stored in the barcode according to an embodiment of the present invention.

A controller 110 controls the general operation of the portable terminal.

The controller 110 controls a barcode generator 170 such that high capacity data is stored in the barcode, and controls a barcode recognizer 180 such that data stored in the high-capacity barcode is recognized.

A camera unit 140 photographs image data, and includes a camera sensor for converting a photographed optical signal to an electric signal and a signal processor for converting an analog image signal photographed by the camera sensor to digital data. It is assumed that the camera sensor is a Charge-Coupled Device (CCD) sensor or a Complementary Metal Oxide Sensor (CMOS) sensor, and the signal processor is implemented in a Digital Signal Processor (DSP). The camera sensor and the signal processor can be integrated or separate.

Further, the camera unit 140 photographs a barcode printed on a paper according to an embodiment of the present invention.

An image processor 150 performs Image Signal Processing (ISP) for displaying an image signal output from the camera unit 140 on a display unit 160. The ISP performs functions, such as gamma correction, interpolation, spatial change, an image effect, an image scale, Auto White Balance (AWB), Auto Exposure (AE), and Auto Focus (AF). Thus, the image processor 150 processes the image signal output from the camera unit 140 frame-by-frame, and outputs the frame image data depending on a characteristic and a size of the display unit 160. The image processor unit 150 includes an image codec, and compresses the frame image data displayed on the display unit 160 in a preset scheme or restores the compressed frame image data to the original frame image data. The image codec may include a Joint Photographic Experts Group (JPEG) codec, a Motion Pictures Experts Group (MPEG) 4 codec, or a Wavelet codec. The image processor 150 is assumed to have an On-Screen Display (OSD) function and may output OSD data in accordance with a size of a screen displayed under the control of the controller 110.

The display unit 160 displays an image signal output from the image processor 150 on a screen and displays user data output from the controller 110. The display unit 160 may employ a Liquid Crystal Display (LCD) and may also include an LCD controller, a memory capable of storing image data, an LCD display device, and the like. When the LCD is used in a touchscreen scheme, the LCD may be used as an input unit, and the display unit 160 may display the keys included in the key input unit 127.

The barcode generator 170 generates a barcode including a symbol region in which data is stored and a pattern region in which information on a position of a barcode and data stored in the symbol region is stored.

The pattern region includes start patterns and information patterns and is at the outer periphery of the barcode. The barcode generator 170 configures the start patterns at each of both ends of an upper edge of the barcode and a lower end of a right edge of the barcode. If the start patterns exist at both ends of the upper edge of the barcode and the lower end of the right edge of the barcode, the barcode generator 170 may signal that the barcode is positioned correctly. The barcode generator 170 stores various types of data, including, for example, NWC, text (TXT), and JPEG (JPG), stored in the symbol region in the information patterns, the type of barcodes representing a size of a barcode, and size information on the data stored in the symbol region.

According to an embodiment of the present invention, the barcode generator 170 groups a plurality of error correction blocks into a plurality of groups for efficient error correction of the data stored in the symbol region, and when the barcode generator 170 positions the error correction blocks in the symbol region, it connects the a plurality of error correction blocks belonging to the same group from one another and positions the connected error correction blocks. Each of the plurality of groups includes, for example, no less than 8 error correction blocks and no more than 50 error correction blocks.

In positioning the error correction blocks in the symbol region, the barcode generator 170 does not position other error correction blocks belonging to the same group as that of positioned error correction blocks on a transverse symbol line (e.g., symbols that are transversely arranged) and a longitudinal symbol line (e.g., symbols that are longitudinally arranged) including the positioned error correction blocks and on a predetermined symbol region based on the positioned error correction blocks.

The predetermined region may be a region having a transverse length and a longitudinal length (e.g., the length and width of the predetermined region) .each of which corresponds to no less than 8 symbols and no more than 30 symbols including the positioned error correction blocks at a center thereof.

Further, the error correction block is placed in a unit having a size of 8 bits or 4 bits, and may include four symbols in a transverse direction and two symbols in a longitudinal direction, four symbols in a transverse direction and four symbols in a longitudinal direction, and two symbols in a transverse direction and four symbols in a longitudinal direction.

The barcode generator 170 generates the error correction blocks using the Reed-Solomon algorithm.

According to an embodiment of the present invention, when an error is generated in a predetermined error correction block positioned in the symbol region, the barcode generator 170 recovers the error correction block (e.g., deleting the error) including the generated error through the plurality of error correction blocks belonging to the same group as that of the error correction block including the generated error.

According to an embodiment of the present invention, the barcode recognizer 180 positions the barcode at a correct position through the start patterns of the pattern region of the barcode photographed by the camera unit 140. Further, the barcode recognizer 180 extracts information on the type of data stored in the symbol region, the type of barcode, and a size of the data stored in the symbol region through the information patterns of the pattern region.

According to an embodiment of the present invention, the barcode recognizer 180 sets an upper region of the symbol region of the barcode as a first search region in which searching is not restricted and a lower region of the symbol region as a second search region in which searching is restricted. When a symbol is searched for in the second search region, the movement for search is restricted to a first symbol line in the upper and lower edges.

According to an embodiment of the present invention, the barcode recognizer 180 extracts data while a symbol is searched for in the symbol region, which is divided into the first search region and the second search region.

In order to extract data while searching for a symbol in the symbol region, the barcode recognizer 180 moves by one pixel upward, downward, leftward, and rightward from a position of a predetermined symbol in the symbol region and extracts an average value for a symbol included in each of four moved symbol positions (i.e., symbol position 1 to symbol position 4). The barcode recognizer 180 moves by one pixel upward, downward, leftward, and rightward from the four moved symbol positions (i.e., symbol position 1 to symbol position 4) and extracts a value based on the existence or absence of a symbol in each of four moved symbol positions (symbol position 1-1 to symbol position 4-1). Then, the barcode recognizer 180 searches for a symbol positioned at a symbol position, which has the largest value among values obtained by adding each value of four moved symbol positions to the values each depending on the existence or absence of a symbol and the average value, among the four moved symbol positions (symbol position 1 to symbol position 4), and extracts the data from the found symbol.

Generating and recognizing a barcode in the portable terminal will be described with reference to FIGS. 2 to 7 in detail.

Figure 2:
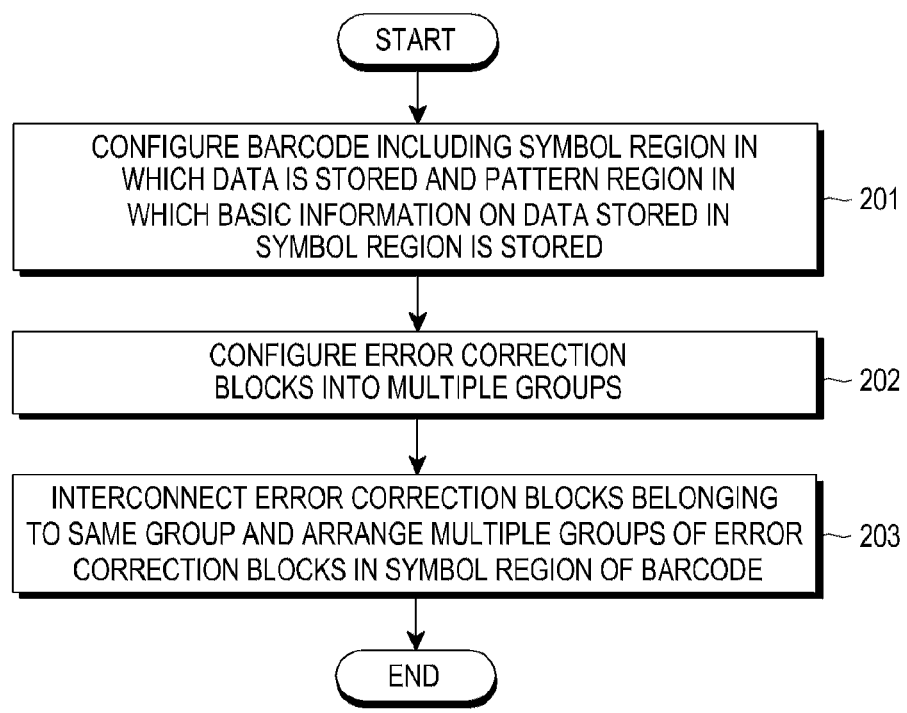
FIG. 2 is a flowchart illustrating a process of generating a barcode in a portable terminal according to an embodiment of the present invention.
Figure 3A:
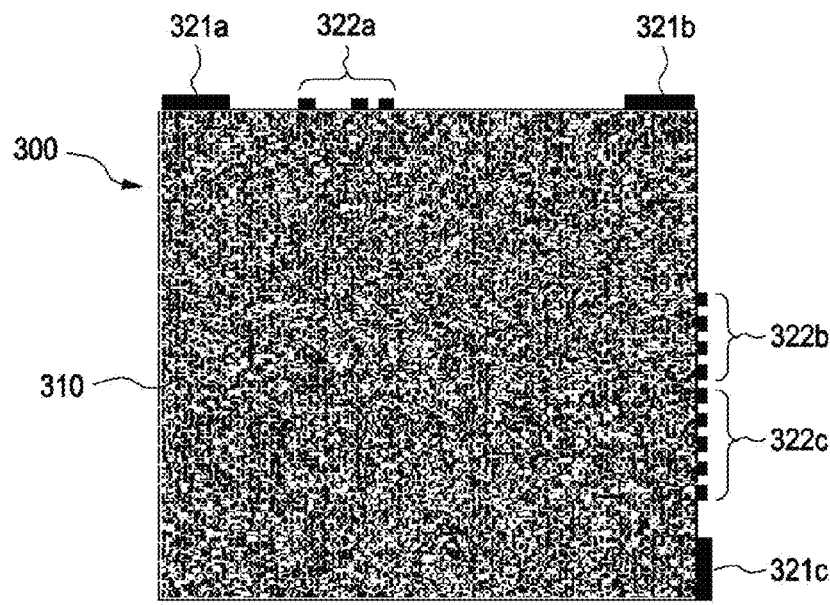
FIGS. 3A and 3B illustrate a pattern region of FIG. 2.
Figure 3B:
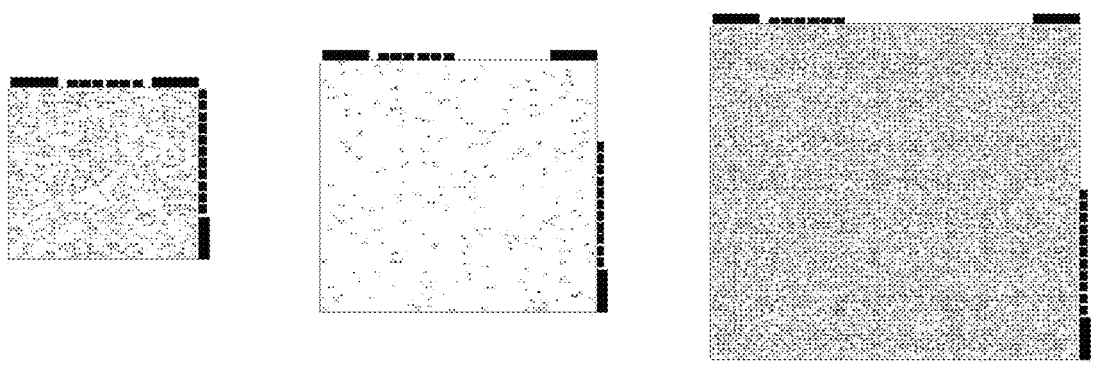
Figure 4A:
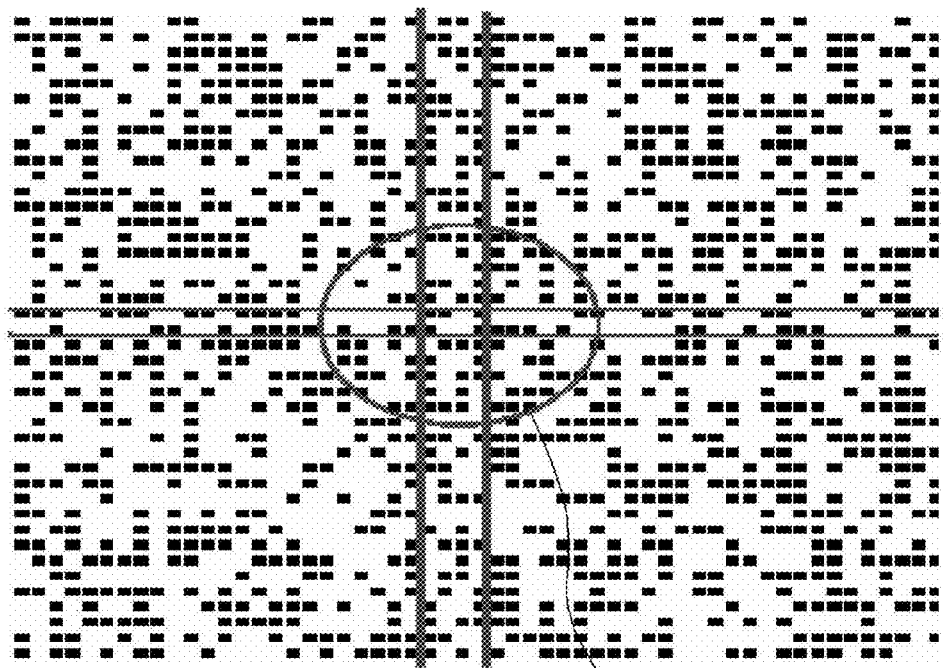
FIGS. 4A and 4B illustrate the error correction blocks of FIG. 2.
Figure 4B:
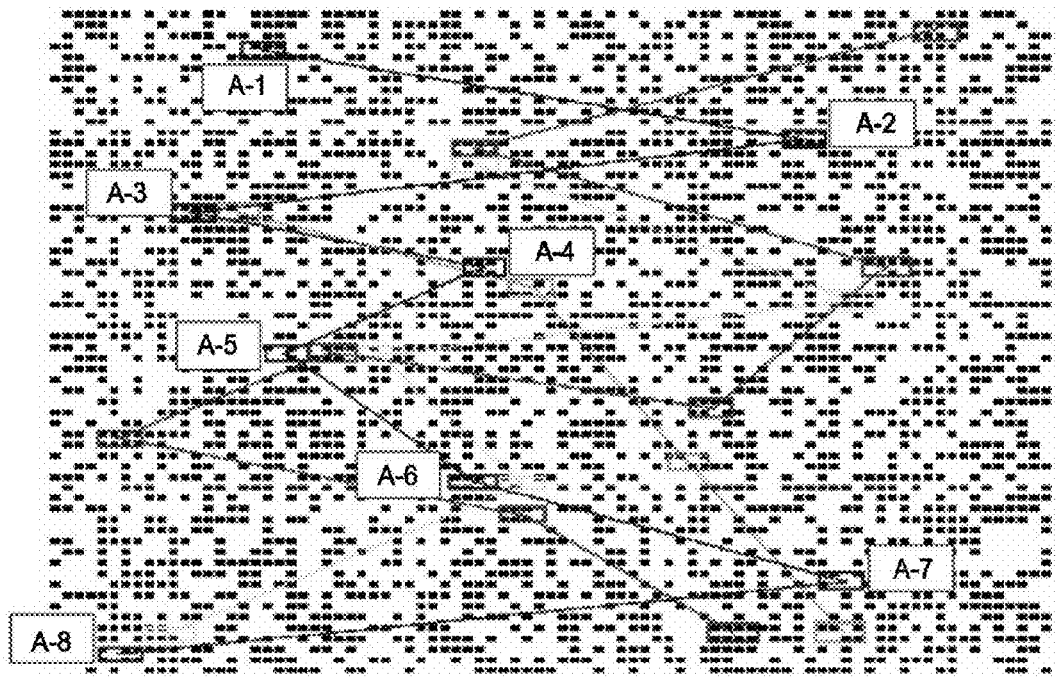

FIG. 2 is a flowchart illustrating a process of generating a barcode in a portable terminal according to an embodiment of the present invention, FIGS. 3A and 3B illustrate a pattern region of FIG. 2, and FIGS. 4A and 4B illustrate the error correction blocks of FIG. 2.

Referring to FIG. 2, the barcode generator 170 configures a barcode including a symbol region in which actual data is stored and a pattern region in which information on the data stored in the symbol region is stored in step 201.

In step 201, the pattern region includes start patterns and information patterns and the barcode generator 170 configures the pattern region at an outer periphery of the barcode, i.e., near the edges. The start patterns are positioned at both ends of an upper edge of the barcode and a lower end of a right edge of the barcode, i.e., the upper left, upper right and lower right corners. Then, when the start patterns are formed at both ends of the upper edge of the barcode and the lower end of the right edge of the barcode, the barcode recognizer 180 determines that the barcode is positioned correctly.

The information patterns include information on the type of data stored in the symbol region, the type of the barcode, and the size of the data stored in the symbol region.

In the pattern region shown in FIG. 3A, the barcode 300 is composed of the symbol region 310 and the pattern region 321a to 321c and 322a to 322c, the start patterns are positioned at both ends 321a and 321b of the upper edge of the barcode 300 and the lower end 321c of the right edge of the barcode 300, and the information patterns are formed at the upper edge 322a and the right edges 322b and 322c of the barcode 300. The positions of the information patterns may be changed in various ways.

The information pattern has 17 bits for recording three types of data. The information pattern formed at the upper edge 322a of the barcode 300 has 1 bit for encoding the type of data stored in the symbol region and storing the encoded data and 1 bit for future use. An example of the type of data is as follows.

TABLE 1

| Data Type | |
|---|---|
| bit | definition |
| 00 | NWC |
| 01 | TXT |
| 10 | JPG |
| 11 | <empty> for future use |

The information pattern formed at the right edge 322b of the barcode 300 has 1 bit for storing the type of the barcode and 1 bit for expansion. An example of the type of the barcode is as follows.

TABLE 2

| Code Type | |
|---|---|
| bit | definition |
| 00 | CODE1 |
| 01 | CODE2 |
| 10 | CODE3 |
| 11 | <empty> for future use |

"CODE 1" has a size of 1 cm,
"CODE 2" has a size of 1.5 cm, and
"CODE 3" has a size of 2 cm.
FIG. 3B illustrates "CODE 1", "CODE 2", and "CODE 3" from a left edge.

The information pattern positioned at the right edge 322c of the barcode 300 has 13 bits for storing a size of actual data encoded and stored in the symbol region.

When the barcode is generated in step 201, the barcode generator 170 groups error correction blocks into a plurality of groups in step 202.

In step 202, the barcode generator 170 generates the error correction block using the Reed-Solomon algorithm. The generated error correction blocks correspond to RS blocks, which are configured based on the function RS(255, 128, 127) according to an embodiment of the present invention.

In the function RS(255, 128, 127), "255" corresponds to data bytes available for configuration of maximum data, "128" corresponds to data bytes of actual data, and "127" corresponds to data bytes available for restoration of actual data.

The barcode generator 170 groups the error correction blocks into the plurality of groups including no less than 8 blocks and no more than 50 blocks. In positioning the error correction blocks in the symbol region, the barcode generator 170 connects only error correction blocks belonging to the same group from one another in step 203.

The error correction block is in a unit of 1 byte, i.e. 8 bits, and the single error correction block may include four symbols in a transverse direction and two symbols in a longitudinal direction, two symbols in a transverse direction and four symbols in a longitudinal direction, and four symbols in a transverse direction and four symbols in a longitudinal direction.

Then, in positioning the error correction blocks in the symbol region, the barcode generator 170 does not position other error correction blocks belonging to the same group as that of the positioned error correction blocks on a transverse symbol line and a longitudinal symbol line including the positioned error correction blocks and on a predetermined symbol region including the positioned error correction blocks at the center thereof. The predetermined symbol region may be a unit region having a transverse length and a longitudinal length, each of which corresponds to no less than 8 symbols and no more than 30 symbols including the positioned error correction blocks at a center thereof.

The aforementioned positioning of the error correction blocks is more efficient at recovering a data error.

Further, when an error is generated in the error correction block positioned in the symbol region, the barcode recognizer 180 recovers the error correction block including the generated error through the error correction blocks belonging to the same group as that of the error correction block including the generated error. The recovery of the error correction block including the generated error through the error correction blocks belonging to the same group as that of the error correction block including the generated error is executed by the Reed-Solomon algorithm.

In the error correction blocks illustrated in FIGS. 4A and 4B, FIG. 4A illustrates that when the error correction blocks in the unit of 8 bits are positioned in the symbol region, error correction blocks belonging to the same group as that of the positioned error correction blocks cannot be positioned on a transverse symbol line, a longitudinal symbol line, and a predetermined symbol region 401.

FIG. 4B illustrates that among the error correction blocks grouped into the plurality of groups, error correction blocks belonging to the same group are connected and positioned in the symbol region 310. When an error is generated in error correction block A-1, A-1 through A-# belonging to same group A, other elements included in the remaining connected error correction blocks A-2 through A-# can recover an element of the error correction block A-1.

The error correction blocks positioned in the symbol region are efficient in the case of a random error and a burst error, and it is possible to recover possible data loss through the error correction blocks when the barcode is printed on paper.

Encoded high capacity data having a total size of 10000 bytes, including the error correction code, can be stored in the symbol region of the barcode generated through the process of FIG. 2, and the barcode generated through the above process may be printed on paper through a printer connected to the portable terminal.

A process of recognizing and storing the barcode printed on paper will be described with reference to FIGS. 5 to 7.

Figure 5:
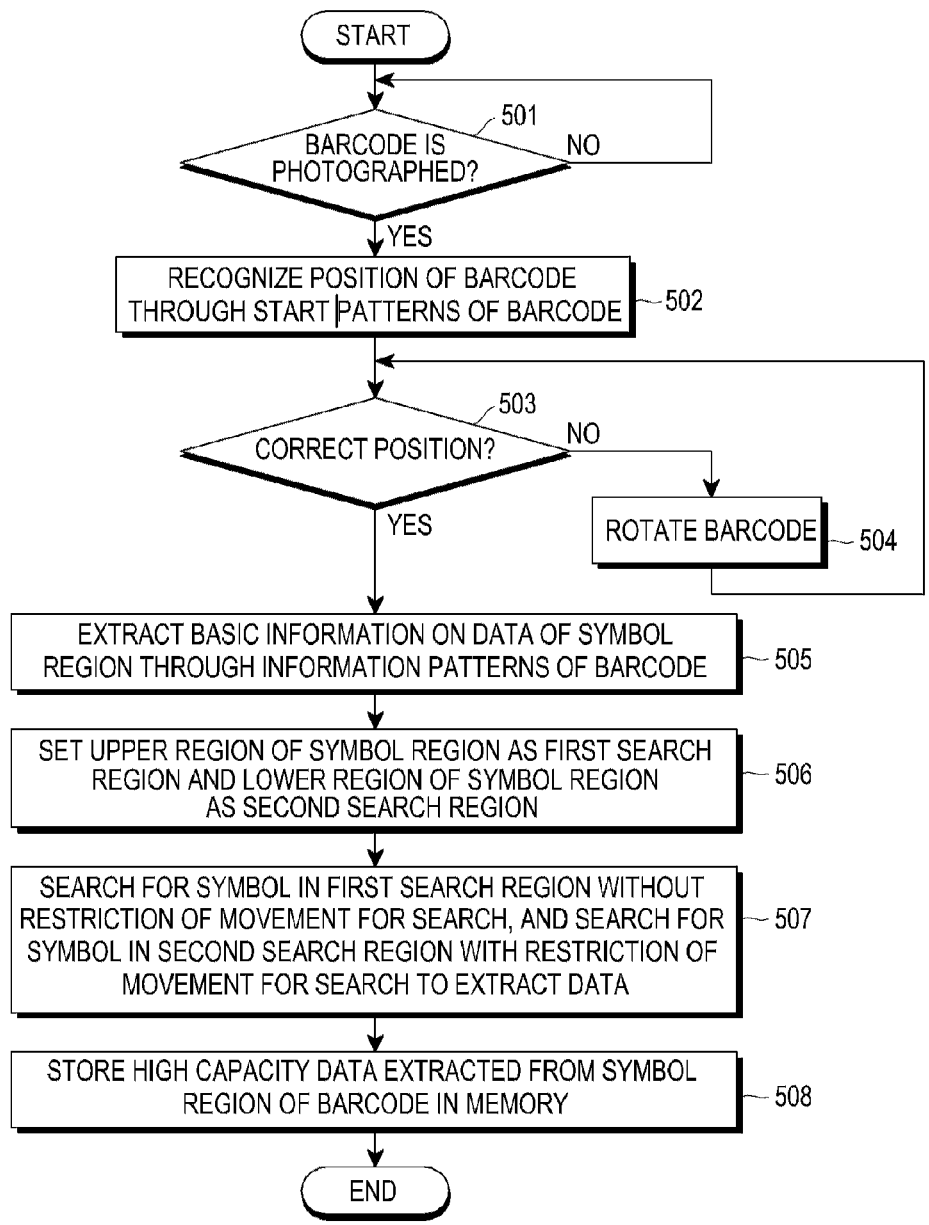
FIG. 5 is a flowchart illustrating a process of recognizing a barcode in a portable terminal according to an embodiment of the present invention.
Figure 6:
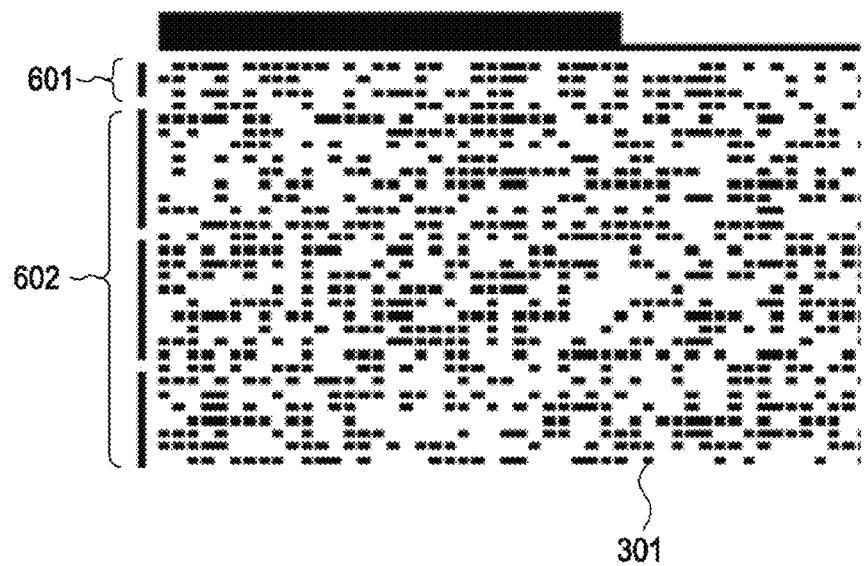
FIG. 6 illustrates a symbol region divided into two search regions in FIG. 5.
Figure 7:
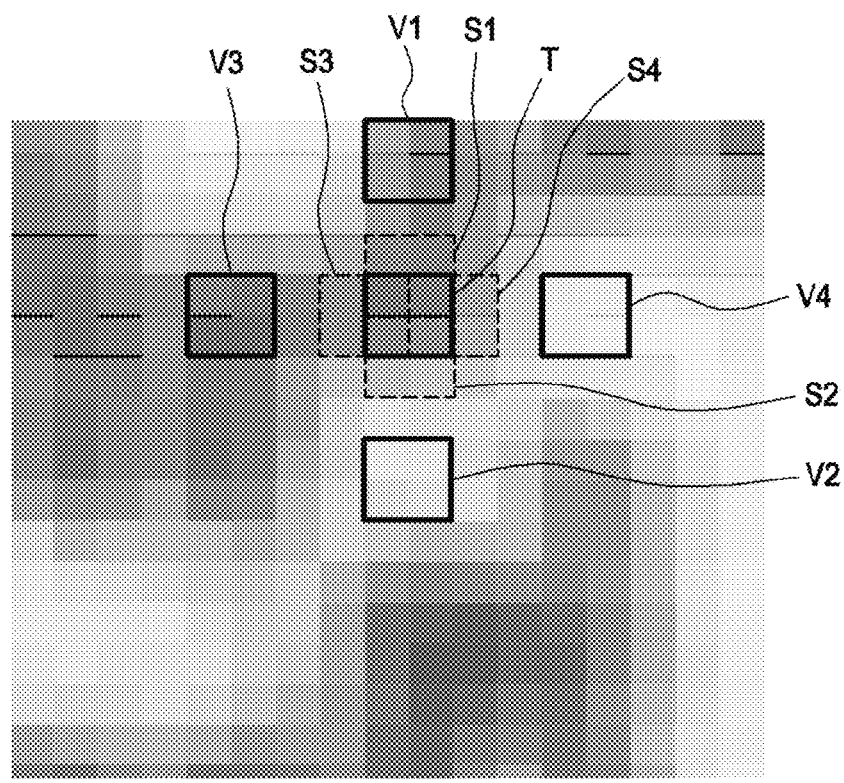
FIG. 7 illustrates a step of searching for a symbol of a barcode of FIG. 5 and extracting data.

FIG. 5 is a flowchart illustrating a process of recognizing a barcode in a portable terminal according to an embodiment of the present invention, FIG. 6 illustrates a symbol region divided into two search regions of FIG. 5, and FIG. 7 illustrates an operation of searching for a symbol of the barcode of FIG. 5 and extracting data.

Referring to FIG. 5, when a barcode printed on paper is photographed by the camera unit 140 of FIG. 1, the barcode recognizer 180 of FIG. 1 detects the photographed barcode in step 501 and determines a position of the photographed barcode through start patterns formed at an outer periphery of the barcode in step 502.

When it is determined that the barcode is positioned correctly, the barcode recognizer 180 detects that the barcode is positioned correctly in step 503 and proceeds to step 505. However, when it is determined that the barcode is positioned at an incorrect position, the barcode recognizer 180 detects that the barcode is positioned at the incorrect position in step 503, rotates the position of the barcode in order to position the barcode at the correct position in step 504 and then proceeds to step 505.

When the barcode is positioned at the correct position, the barcode recognizer 180 extracts basic information on data stored in the symbol region, i.e. the type of data, the type of the barcode, and a size of the data stored in the symbol region, through information patterns of the barcode in step 505.

The barcode recognizer 180 then sets an upper region of the symbol region of the barcode as a first search region in which searching is not restricted and a lower region of the symbol region as a second search region in which searching is restricted in step 506. The first search region may be transverse symbol lines 0 to 100 and the second search region may be transverse symbol lines 101 to the last symbol line. FIG. 6 illustrates a symbol region 301 divided into a first search region 601 and a second search region 602.

When the first search region and the second search region are set in step 506 of FIG. 5, the barcode recognizer 180 searches for a symbol in the symbol region and extracts data in step 507.

When the barcode is printed on paper, a large amount of irregularity, blurring, distortion, and toner spread may be generated. Therefore, in order to search for a normal symbol in the barcode having irregularity, blurring, distortion, or toner spread, the barcode recognizer 180 uses an auto-recognition algorithm in step 507.

Referring to FIG. 7, in searching for a normal symbol using the auto-recognition algorithm, the barcode recognizer 180 searches for a symbol in a unit of a transverse symbol line. In the above search process, the barcode recognizer 180 moves by one pixel upward, downward, left, and rightward from a predetermined symbol position T and extracts an average value for a symbol included in each of four moved symbol positions S1 to S4. The single symbol is composed of four pixels.

The barcode recognizer 180 moves by one pixel upward, downward, leftward, and rightward from the four moved symbol positions S1 to S4 and extracts a value depending on the existence or absence of a symbol in four moved symbol positions V1 to V4. The value depending on the existence or absence of a symbol is "1" when a symbol exists in a corresponding symbol position, and is "0" when no symbol exists in a corresponding symbol position or when the position has a value equal to or smaller than an average value that the symbol may have.

The barcode recognizer 180 then extracts the data while searching for a symbol positioned at the symbol position S2, which has the largest value among values obtained through adding the average value to the values each depending on the existence or absence of a symbol among the four moved symbol positions S1 to S4.

In the process of searching for the symbol using the auto-recognition algorithm, searching for the symbol is restricted to the second search region and searching the second search region is restricted to a first symbol line in upper and lower edges.

When the DPI is high, i.e. a storage capacity is high, it is difficult to accurately find a start point of the symbol region. In order to find an accurate start point again after finding a start point of the symbol region through the start patterns formed at the symbol region of the barcode, searching for a symbol is not restricted in the first search region of the symbol region when a symbol is searched for using the auto-recognition algorithm.

When data is extracted through the search of a symbol in step 507, the controller 110 stores the extracted data together with basic information on the data extracted in step 505 in the memory 130 in step 508.

In an embodiment of the present invention, the portable terminal includes all constructions for generating and recognizing the barcode, but may separately include an apparatus for generating the barcode. Further, every apparatus, such as a web-cam, a digital camera, and a scanner having an optical sensor capable of recognizing the barcode, as well as the portable terminal, can recognize and store the barcode.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An apparatus for generating and recognizing a barcode in a portable terminal, the apparatus comprising:
   a barcode generator for dividing a barcode into a symbol region, in which data is stored, and a pattern region, in which information on a position of the barcode and the data stored in the symbol region is stored, and positioning a plurality of groups of error correction blocks while interconnecting a plurality of error correction blocks belonging to a same group in the symbol region; and
   a barcode recognizer for extracting information on the position of the barcode and the data stored in the symbol region through the pattern region of the barcode and searching for a symbol in the symbol region to extract data from the searched symbol.

2. The apparatus of claim 1, wherein the barcode generator configures the pattern region including start patterns and information patterns at an outer periphery of the barcode, and the start patterns are formed at both ends of an upper edge of the barcode and a lower end of a right edge of the barcode, and the information patterns include information on a type of the data stored in the symbol region, a type of the barcode, and a size of the data stored in the symbol region.

3. The apparatus of claim 1, wherein the barcode generator groups the error correction blocks into the plurality of groups, interconnects the plurality of error correction blocks belonging to the same group, and positions the connected error correction blocks in the symbol region.

4. The apparatus of claim 3, wherein in positioning the connected error correction blocks in the symbol region, the barcode generator does not position a error correction blocks belonging to the same group in a transverse symbol line and a longitudinal symbol line including the positioned error correction blocks and a predetermined symbol region based on the positioned error correction blocks.

5. The apparatus of claim 3, wherein when an error is generated in a predetermined error correction block positioned in the symbol region, the barcode generator recovers the error correction block containing the generated error through other error correction blocks in the same group as the error correction block containing the generated error.

6. The apparatus of claim 1, wherein the barcode recognizer positions the barcode correctly by reading start patterns of the pattern region of a photographed barcode, and extracts information on a type of the data stored in the symbol region, a type of the barcode, and a size of the data stored in the symbol region by reading information patterns in the pattern region.

7. The apparatus of claim 1, wherein the barcode recognizer sets an upper region of the symbol region of the barcode as a first search region in which searching is not restricted and a lower region of the symbol region as a second search region in which searching is restricted, and extracts data while searching for the symbol in the symbol region.

8. The apparatus of claim 7, wherein when the barcode recognizer searches for the symbol in the second search region, the searching is restricted to a first symbol line in upper and lower edges.

9. The apparatus of claim 1, wherein the barcode recognizer moves by one pixel upward, downward, leftward, and rightward from a position of a predetermined symbol in the symbol region and extracts an average value for a symbol included in each of the four moved symbol positions,
   moves by one pixel upward, downward, leftward, and rightward from the four moved symbol positions and
   extracts a value based on existence or absence of a symbol in each of the four moved symbol positions, and
   searches for a symbol positioned at a symbol position, which has a largest value among a plurality of values obtained by adding each value of the four moved symbol positions to the values each based on the existence or absence of a symbol and the average value, among the four moved symbol positions and extracts the data from the found symbol.

10. A method of generating and recognizing a barcode in a portable terminal, the method comprising:
    generating a barcode by configuring the barcode to include a symbol region, in which data is stored, and a pattern region, in which information on a position of the barcode and the data stored in the symbol region is stored, and positioning a plurality of groups of error correction blocks while interconnecting a plurality of error correction blocks belonging to a same group in the symbol region; and
    recognizing the barcode by extracting information on the position of the barcode and the data stored in the symbol region through the pattern region of the barcode, and searching for a symbol in the symbol region to extract data from the searched symbol.

11. The method of claim 10, wherein the pattern region includes start patterns and information patterns and is formed at an outer periphery of the barcode, the start patterns are formed at both ends of an upper edge of the barcode and a lower end of a right edge of the barcode, and the information patterns contain information on a type of the data stored in the symbol region, a type of the barcode, and a size of the data stored in the symbol region.

12. The method of claim 10, wherein generating the barcode comprises:
grouping the plurality of error correction blocks into the plurality of groups; and
positioning the error correction blocks grouped into the plurality of groups in the symbol region while interconnecting error correction blocks belonging to a same group and positioning the connected error correction blocks in the symbol region.

13. The method of claim 12, wherein in positioning of the error correction blocks in the symbol region, error correction blocks belonging to the same group to that of the positioned error correction blocks are not positioned on a transverse symbol line and a longitudinal symbol line including the positioned correction blocks and a predetermined symbol region based on the positioned error correction blocks.

14. The method of claim 10, wherein generating the barcode further comprises:
when an error is generated in a predetermined error correction block positioned in the symbol region, recovering the error correction block including the generated error using error correction blocks belonging to the same group to that of the error correction block including the generated error.

15. The method of claim 10, wherein recognizing the barcode comprises:
determining, when the barcode is photographed, a position of the barcode through the start patterns of the pattern region of the photographed barcode and positioning the barcode correctly; and
extracting information on a type of the data stored in the symbol region, a type of the barcode, and a size of the data stored in the symbol region through information patterns in the pattern region.

16. The method of claim 10, wherein recognizing the barcode comprises:
setting an upper region of the symbol region of the barcode as a first search region in which searching is not restricted and a lower region of the symbol region as a second search region in which searching is restricted; and
extracting data while searching for a symbol in the symbol region set as the first search region and the second search region.

17. The method of claim 16, wherein, when the symbol is searched in the second search region, the searching is restricted to a first symbol line in upper and lower edges.

18. The method of claim 16, wherein extracting the data comprises:
moving by one pixel upward, downward, leftward, and rightward from a position of a predetermined symbol in the symbol region and extracting an average value for a symbol included in each of the four moved symbol positions;
moving by one pixel upward, downward, leftward, and rightward from the four moved symbol positions and extracting a value depending on existence or absence of a symbol in each of the four moved symbol positions; and
searching for a symbol positioned at the symbol position, which has a largest value among values obtained by adding each value of the four moved symbol positions to the values each depending on the existence or absence of a symbol and the average value, among the four moved symbol positions and extracting the data from the found symbol.

* * * * *